Nov. 23, 1943.     A. P. FERGUESON     2,334,867
FENDER SHIELD LATCHING MECHANISM
Filed Feb. 2, 1942          2 Sheets-Sheet 1
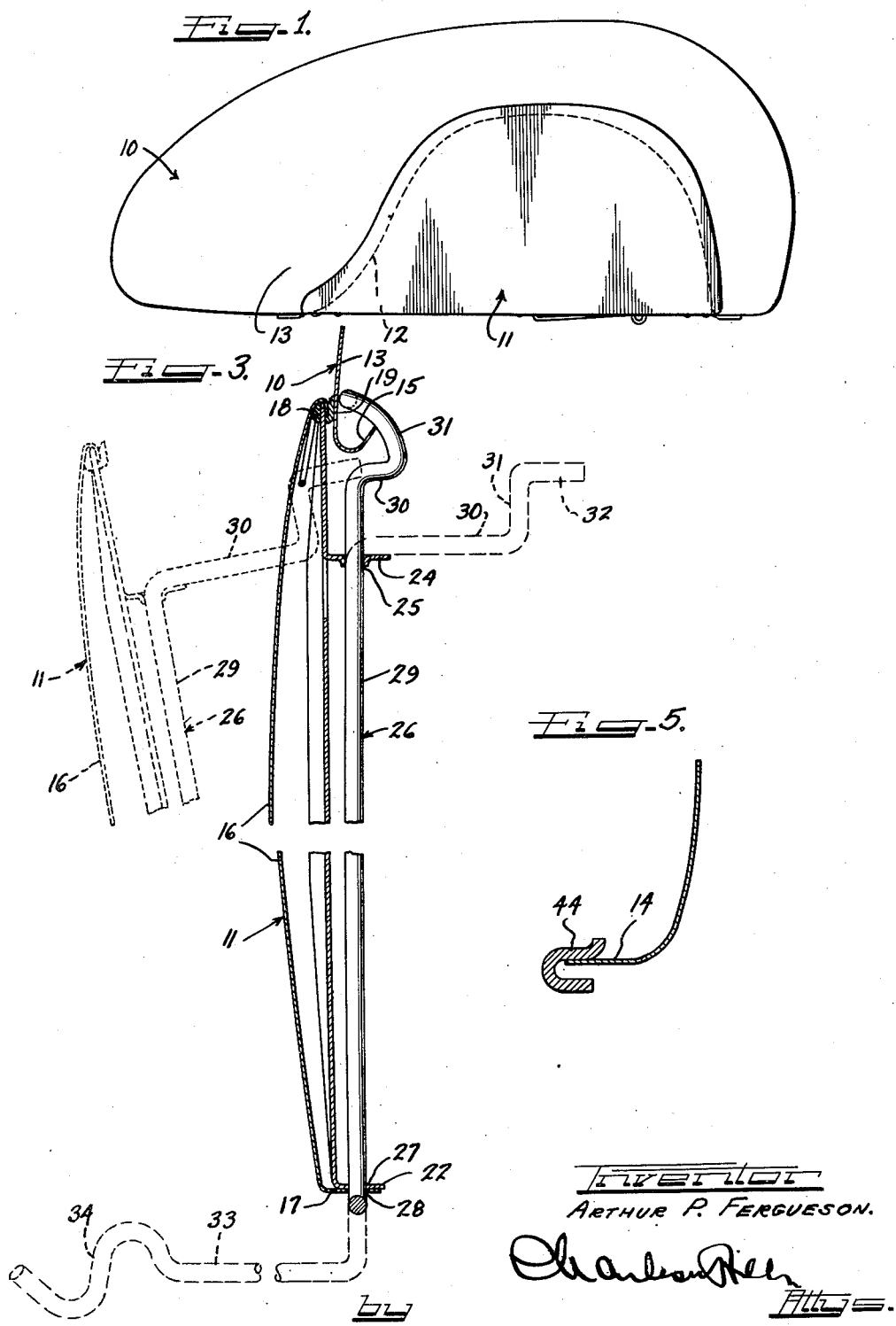
Inventor
ARTHUR P. FERGUESON.

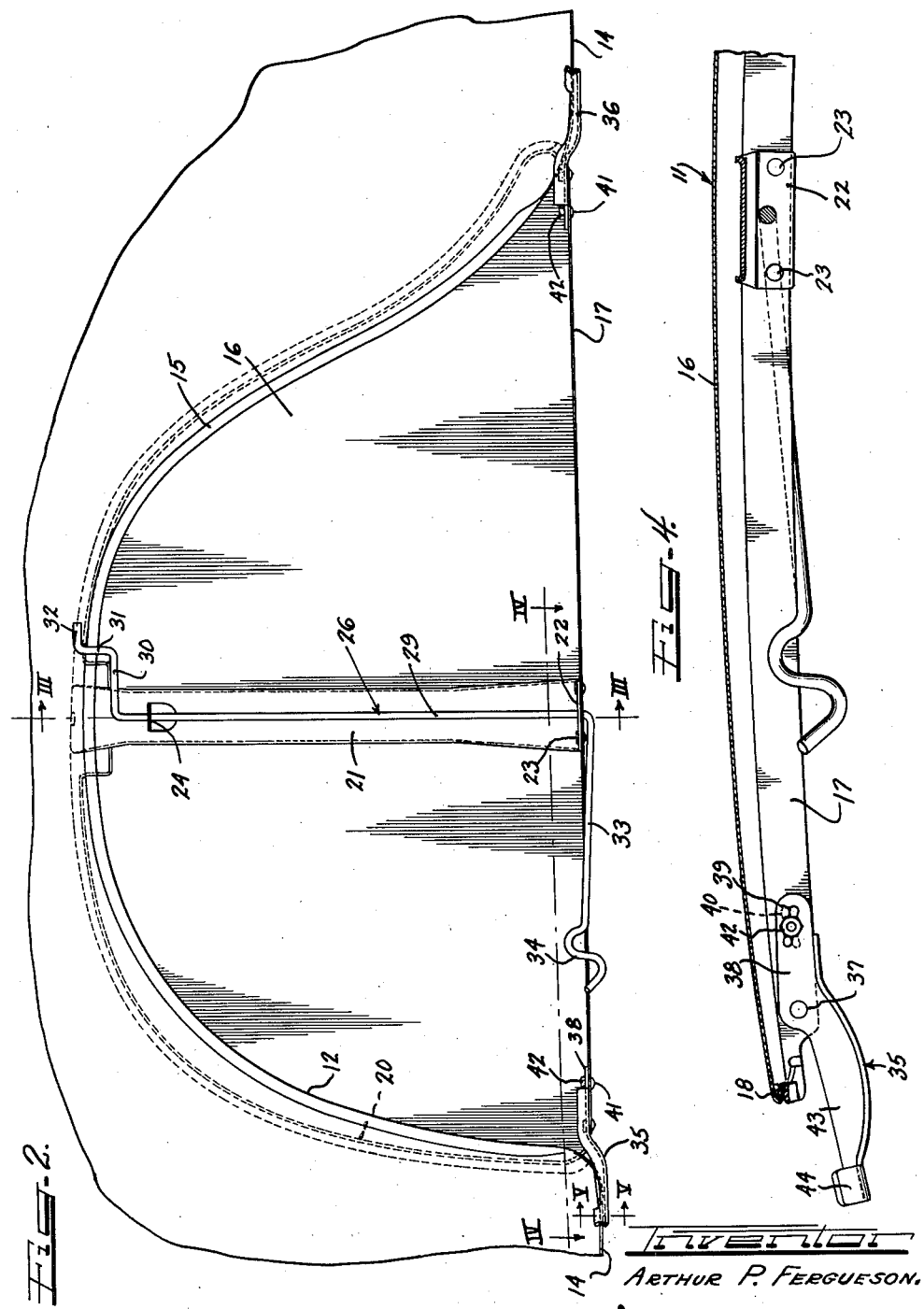

Patented Nov. 23, 1943

2,334,867

UNITED STATES PATENT OFFICE 2,334,867

FENDER SHIELD LATCHING MECHANISM

Arthur P. Fergueson, Detroit, Mich., assignor to Houdaille-Hershey Corporation, Detroit, Mich., a corporation of Michigan Application February 2, 1942, Serial No. 429,165

5 Claims. (Cl. 292—57)

This invention relates to fender and fender shield constructions, and more particularly, to a novel method and means for mounting and securing fender shields to a vehicle fender, and to novel clamping and latching mechanisms therefor.

In the vehicle industry, and particularly in the automobile industry, various means have been utilized to improve the appearance of vehicle fenders. The usual vehicle fender is provided with an opening which provides access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a novel fender shield latching mechanism for detachably securing a fender shield to a vehicle body.

It is a further object of this invention to provide a novel combination fender and fender shield construction in which the fender shield is secured to the fender in a novel manner.

Another object of the present invention is to provide a fender shield having novel clamping means thereon.

The novel features which I believe to be characteristic of my invention are set forth with particularity in the appended claims. My invention itself, however, both as to its organization, manner of construction and method of operation, together with further objects and advantages thereof, may best be understood by reference to the accompanying drawings, in which:

Figure 1 is a front elevational view of a vehicle fender and fender shield assembly;

Figure 2 is an enlarged rear elevational view of the fender and fender shield assembly shown in Figure 1;

Figure 3 is an enlarged sectional view taken along the line III—III of Figure 2;

Figure 4 is a fragmentary horizontal sectional view of the lower left portion of the fender shield shown in Figure 2 as taken along the line IV—IV of Figure 2; and, Figure 5 is an enlarged fragmentary sectional view through the end of one of the trunnion members as taken along the line V—V in Figure 2.

Referring now to the various figures of the drawings, which illustrate one embodiment of the present invention, there is illustrated therein a vehicle fender 10 having a fender shield 11 mounted thereon over a wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crowned type. The fender shield 11 is detachably mounted on the vehicle fender 10 in a position to cover the relatively large opening 12 in the outer side wall 13 of the fender 10, which is conventionally provided in substantially all vehicle fenders to permit access to and removal of the vehicle wheel therethrough.

The fender 10 is provided with a flat inwardly extending base flange 14 on either side of the fender opening 12 and a rolled flange 15 which in transverse cross section assumes the shape of an open fold and which extends substantially entirely around the edge which defines the opening 12.

The fender shield 11 comprises a panel portion 16 which is large enough to extend over the entire opening 12 as well as to overlap the marginal portion of the fender 10 around the opening 12. The lower edge of the panel portion 16 merges into an inwardly extending base flange portion 17. The remaining edge portion of the panel 16 merges into an inturned peripheral flange 18 which extends around substantially the entire end and top portions of the fender shield 11.

In order to prevent a direct metal to metal contact between the fender shield 11 around its marginal portion where it is seated on the fender 10, a rubber cushioning bead or other suitable strip of yieldable material 19 is provided. While the cross-sectional configuration of this cushioning strip 19 may vary widely, the strip is preferably shaped to fit over and around the inturned folded edge 18. The strip may be secured to the fender shield 11 in any suitable manner, such for example as by means of a wire 20 which is secured at the two lower corners of the fender shield and which normally tends to move radially outwardly of the fender shield panel to press and hold the cushioning strip 18 in tight engagement with the folded edge 19.

The panel 16 of the fender shield 11 is reinforced and stiffened by a vertically extending strut 21 which is slightly channel shape in cross section (see Figure 4). The lower end of the strut 21 is provided with a foot or base portion 22 which is riveted or otherwise suitably secured to the base flange 17 of the fender shield 11 as at 23. The upper end of the strut 21 is spot welded, or otherwise suitably secured to the flange 18 at the top of the fender shield 11. For a reason which will presently appear, a tongue 24 is struck out of the upper portion of the web of the strut 21, and the tongue 24 is centrally apertured as at 25.

A torsion rod or clamping member 26 is mounted on the rear of the fender shield 11, and this rod 26 extends up through the aperture 25 in the tongue 24. The rod 26 also extends down through an aperture 27 in the foot portion 22 and through an aperture 28 in the base flange 17 of the fender shield 11. The upper end of the torsion rod 26 is bent at right angles to the main portion 29 as at 30. It is then bent upwardly and forwardly in an arcuate portion 31 and terminates in a tip portion 32 which extends at right angles to the general direction of extension of the arcuate portion 31.

The torsion rod 26 has its lower end bent substantially at right angles to the direction of the principal portion 29 as at 33. The portion 33 terminates in an S-shaped portion 34, this S-shaped portion 34 is so bent as to lie in a plane extending obliquely downwardly and rearwardly from the panel 16 of the fender shield 11. As will presently appear, this S-shaped end portion 34 is arranged to be snapped over and seated on the base flange 17 of the fender shield 11.

A pair of hook-shaped supporting arms 35 and 36 are provided at the two lower corners of the fender shield 11. These arms 35 and 36 are pivotally mounted to the base flange 17 of the fender shield 11 as at 37. The arms 35 and 36 each include a tail portion 38 which is provided with a slot 39 which overlies and extends at an angle to a slot 40 in the base flange 17. A bolt 41 extends through the two slots 39 and 40 and is secured in place by a nut 42. As will be apparent from an inspection of Figure 4, the arrangement of the intersecting slots 39 and 40, together with the bolt 41 and the nut 42 provide for limited angular movement of the free end portion 43 of the arms 35 and 36. The outer extremity of the free end portion 43 of each of the arms 35 and 36 is provided with a hook-shaped portion 44 (see Figures 4 and 5), which is arranged to extend around and hook over the base edge 14 of the fender 10.

The fender shield 11 is moved into mounted engagement on the fender 10 by first hooking the ends 44 of the arms 35 and 36 over the base edges 14 of the fender 10 on either side of the fender opening 12. When the end portions 44 are first hooked on to the fender 10 the panel 16 of the fender shield 11 is in the approximate position as shown by the dotted lines in Figure 3. The shield is then rocked about the arms 35 and 36 until the panel 16 is in the position as shown by the full line in Figure 3. During these initial mounting steps the torsion rod 26 is in position as shown by the dotted lines in Figure 3. More particularly, the torsion rod 26 has its lower end portion 34 freed from the base edges 17 of the fender and has its principal portion 29 rotated about its own longitudinal axis through approximately 90° so that the base portion 33 of the torsion rod extends outwardly away from the panel portion 16 of the fender shield 11 at approximately right angles thereto. In this position the torsion rod has dropped down in the aperture 25 of tongue 24 and in the apertures 27 and 28 of the foot 22 and the base flange 17 until the upper portion 30 is seated on the tongue 24. With the rod in this position, the upper portion 30 extends inwardly away from the panel portion 16 at approximately right angles thereto as shown by the long dash line in Figure 3. It will be observed from the dotted line, or short dash line, in Figure 3, that when the torsion rod 26 is in this position the uppermost point thereof as defined by the tip portion 32 has been lowered to a sufficient extent to freely pass below the rolled flange 15 of the fender 10 at the top of the fender opening 12.

After the fender shield 11 has been rocked to the full line position as shown in Figure 3, the lower portion 33 of the torsion rod 36 is lifted upwardly so as to raise the upper portion 30 and the tip portion 32; and it is thereafter rotated through approximately 90° to position the arcuate portion 31 over the inner edge of the rolled flange 15 and to press the tip portion 32 against the inner face of the downwardly depending wall 13 of the fender 10. This pulls the upper edge of the fender shield 11, and particularly the cushioning strip 19, into tight engagement with the fender 10. The angular relationship of the lower portion 33 and the upper portion 30 of the torsion rod 26 as viewed from a horizontal plane, is such that after the tip portion 32 has touched the inner face of the downwardly depending wall 13 of the fender 10, some additional angular movement of the lower portion 33 is necessary to snap the S-shaped portion 34 behind and over the base flange 17 of the fender shield 11. It will thus be understood that when the fender shield is in mounted position on the fender 10 the torsion rod 26 is under internal torsional stress which constantly tends to urge the curved edge of the fender shield against the fender 10. A very tight and secure engagement of the fender shield 11 on the fender 10 results from this stressed condition of the latching mechanism.

While I have shown a particular embodiment of this invention, it will, of course, be understood that I do not wish to be limited thereto, since many modifications may be made and I, therefore, contemplate by the appended claims to cover all such modifications as fall within the true spirit and scope of my invention.

I claim as my invention:

1. In supporting and latching means for detachably securing a fender shield to a fender over the wheel opening therein of the type which includes supporting means for said shield which permits angular movement thereof in a plane transverse to the plane of the fender opening, latching means comprising a torsion rod mounted on the rear of said shield for both rotational movement about its longitudinal axis and translational movement along its longitudinal axis, said torsion rod having an end portion which may be lowered by translational movement along the longitudinal axis of the rod to clear the fender edge defining the fender opening and which may be raised and rotated into engagement with the fender when the shield is rocked into engagement therewith, said rod being torsionally stressed when rotated into engagement with said fender, and means for retaining the rod in a torsionally stressed condition, thereby to retain the shield in mounted engagement on said fender.

2. In supporting and latching means for detachably securing a fender shield to a fender over the wheel opening therein of the type which includes supporting means for said shield which permits angular movement thereof in a plane transverse to the plane of the fender opening, latching means comprising a torsion rod mounted on the rear of said shield for both rotational movement about its longitudinal axis and translational movement along its longitudinal axis, said torsion rod having an upper end portion which is bent at substantially right angles to said rod and a lower portion which is also bent at substantially right angles to the rod, said upper portion and said lower portion being substantially 180° apart as viewed from a plane perpendicular to the direction of extension of said rod, said upper portion being arranged to be lowered by translational movement along the longitudinal axis of the rod to clear the fender edge defining the fender opening, and which may be raised and rotated into engagement with the fender when the shield is rocked into engagement therewith, said upper portion being raised, rotated and held in position against the fender by said lower portion, said lower portion being arranged to snap in position behind a lower portion of said fender shield to hold said torsion rod in its raised position and maintain a torsional stress in said torsion rod.

3. In supporting and latching means for detachably securing a fender shield to a fender over the wheel opening therein of the type which includes supporting means for said shield which permits angular movement thereof in a plane transverse to the plane of the fender opening, latching means comprising a torsion rod mounted on the rear of said shield for both rotational movement about its longitudinal axis and translational movement along its longitudinal axis, said torsion rod having an end portion which may be lowered by translational movement along the longitudinal axis of the rod to clear the fender edge defining the fender opening and which may be raised and rotated into engagement with the fender when the shield is rocked into engagement therewith, and means for torsionally stressing the rod as the shield is moved into engagement with the fender and holding said rod in its raised and torsionally stressed condition to maintain said shield in mounted engagement on said fender.

4. In supporting and latching means for detachably securing a fender shield to a fender over the wheel opening therein of the type which includes supporting means for said shield which permits angular movement thereof in a plane transverse to the plane of the fender opening, latching means comprising a torsion rod mounted on the rear of said shield for both rotational movement about its longitudinal axis and translational movement along its longitudinal axis, said torsion rod having an upper portion bent substantially at right angles to the direction of extension of the rod and a lower portion also bent substantially at right angles to the direction of extension of the rod and substantially 180° displaced from said upper portion, said lower portion terminating in an S-shaped tip portion, said S-shaped tip portion lying in a plane which extends obliquely downwardly and rearwardly when said lower portion of said rod extends generally in the direction parallel to the lower edge of the fender shield, said shield having an inturned portion below which the lower portion of said rod extends, said rod being arranged to be raised and then rotated about its longitudinal axis until the upper portion of said rod extends into engagement with the under side of the vehicle fender and until said S-shaped portion is snapped behind and over said rearwardly extending portion of said shield, said rod being torsionally stressed when in said latter position.

5. Latching mechanism for a fender shield of the type having means for supporting the shield in mounted engagement on a fender over the wheel opening therein and which shield is arranged to be rocked into and out of fender engaging position by movement in a plane transverse to the plane of the fender opening which comprises a torsion rod mounted on the rear of said shield for both rotational movement about its longitudinal axis and translational movement along its longitudinal axis, said torsion rod having an end portion which may be lowered by translational movement along the longitudinal axis of the rod to freely pass through the fender opening and which may be raised and rotated into engagement with the fender when the shield is rocked into engagement therewith, said rod being torsionally stressed when rotated into engagement with said fender, and means for retaining said rod in a torsionally stressed condition, thereby to retain the shield in mounted engagement on the fender.

ARTHUR P. FERGUESON.